US010142207B2

(12) United States Patent
Fan et al.

(10) Patent No.: US 10,142,207 B2
(45) Date of Patent: Nov. 27, 2018

(54) COORDINATION OF SERVING ACCESS NODES IN SERVING CLUSTER

(71) Applicant: Telefonaktiebolaget LM Ericsson (publ), Stockholm (SE)

(72) Inventors: Rui Fan, Beijing (CN); Dennis Hui, Sunnyvale, CA (US); Qianxi Lu, Beijing (CN); Qingyu Miao, Beijing (CN); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 76 days.

(21) Appl. No.: 15/529,994

(22) PCT Filed: Sep. 3, 2015

(86) PCT No.: PCT/IB2015/056725
§ 371 (c)(1),
(2) Date: May 25, 2017

(87) PCT Pub. No.: WO2017/037511
PCT Pub. Date: Mar. 9, 2017

(65) Prior Publication Data
US 2017/0346712 A1    Nov. 30, 2017

(51) Int. Cl.
*H04B 7/02* (2018.01)
*H04L 12/26* (2006.01)
*H04W 36/00* (2009.01)
*H04W 48/12* (2009.01)
*H04W 48/16* (2009.01)
*H04B 7/06* (2006.01)

(52) U.S. Cl.
CPC ........... *H04L 43/0876* (2013.01); *H04B 7/02* (2013.01); *H04W 36/0055* (2013.01); *H04W 36/0083* (2013.01); *H04W 48/12* (2013.01); *H04B 7/0617* (2013.01); *H04W 48/16* (2013.01)

(58) Field of Classification Search
None
See application file for complete search history.

(56) References Cited

U.S. PATENT DOCUMENTS 6,453,176 B1 *   9/2002  Lopes ................... H01Q 1/246
                                                            342/374
2011/0281585 A1   11/2011  Kwon et al.
(Continued)

OTHER PUBLICATIONS

International Search Report and Written Opinion for International Application No. PCT/IB2015/056725, dated May 10, 2016, 10 pages.
(Continued)

*Primary Examiner* — Brian S Roberts
(74) *Attorney, Agent, or Firm* — NDWE LLP (57) ABSTRACT

A method in a Serving Access Node (SAN) for coordinating with a number of other SANs within a terminal device-specific serving cluster to which the SAN belongs. The method comprises determining an assignment of a communication direction to a timeslot. The assignment of the communication direction to the timeslot is common to all SANs in the serving cluster. The method further comprises transmitting or receiving at least one test beam in the communication direction during the timeslot. Correspondingly, a SAN is disclosed in which the method is implemented.

16 Claims, 5 Drawing Sheets

(56) References Cited

U.S. PATENT DOCUMENTS

| 2014/0092760 | A1 |  | 4/2014  | Geirhofer et al. |             |
|--------------|----|--|---------|------------------|-------------|
| 2016/0192176 | A1 | * | 6/2016 | Zhu .............. | H04W 8/005  |
|              |    |   |        |                   | 370/329     |
| 2016/0262084 | A1 | * | 9/2016 | Harada ........... | H04W 8/005  |
| 2016/0294595 | A1 | * | 10/2016 | Harada .......... | H04L 27/2646 |
| 2017/0155481 | A1 | * | 6/2017 | Miao ............. | H04W 76/15  |

OTHER PUBLICATIONS

"Discussion on CSI reporting for Inter eNB CoMP," Feb. 9-13, 2015, 5 pages, 3GPP TSG-RAN WG3 Meeting #87, R3-150309, Ericsson.

International Preliminary Report on Patentability for Application No. PCT/IB2015/056725, dated Mar. 15, 2018, 8 pages.

* cited by examiner

COORDINATION OF SERVING ACCESS NODES IN SERVING CLUSTER

CROSS-REFERENCE TO RELATED APPLICATIONS

This application is a National stage of International Application No. PCT/IB2015/056725, filed Sep. 3, 2015, which is hereby incorporated by reference.

TECHNICAL FIELD

The present disclosure generally relates to the technical field of wireless communications, and more particularly, to a method in a Serving Access Node (SAN) for coordinating with a number of other SANs within a terminal device-specific serving cluster to which the SAN belongs as well as an SAN in which the method is implemented.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In order to enhance the capacity of wireless communication systems, it has been agreed that future wireless communication systems, such as the fifth generation (5G) wireless communication systems, shall operate at higher frequencies as compared with conventional wireless communication systems, such as the third generation (3G) wireless communication systems.

However, due to reduced ability of radio signals at high frequencies to diffract around objects, the radio signal path between a terminal device (such as a user equipment (UE)) and its SAN may be temporarily, but abruptly, blocked by an obstacle and even lost when the terminal device moves or changes its posture. Accordingly, sudden service interruption may be incurred.

The conventional hard handover scheme is incompetent to avoid such service interruption, because the hard handover scheme requires a time-consuming process of transmitting control signaling across several radio access network components and the service interruption might have occurred before the transmitting process is completed.

Instead of using the hard handover scheme, the concept of terminal device-specific serving cluster (SvC) has been proposed to be used in high-frequency wireless communication systems for effecting faster switching of the terminal device between SANs. To be specific, a SvC refers to a group of SANs that are located in the vicinity of a terminal device and are ready to serve the terminal device. When a serving beam between an SAN in the SvC and the terminal device is blocked, communications carried by the beam can be quickly switched over to another beam between a different SAN in the SvC and the terminal device. As such, continuous service provision is ensured by close cooperation among the group of SANs in the SvC and the risk of service interruption can be eliminated.

One of the SANs in the SvC, which conducts communications with the terminal device most of the time, is referred to as a Principal SAN (P-SAN). That is, the P-SAN handles the majority of data to be sent to and to be received from the terminal device. All the other SANs in the SvC are referred to Assistant SANs (A-SANs), whose responsibility is to temporarily take over the communications with the terminal device when a direct signal path between the P-SAN and the terminal device is lost (e.g. because an obstacle is present in the path).

The P-SAN is also responsible to request the A-SANs to measure signal qualities on links between the A-SANs and the terminal device and report the measurements to the P-SAN. Based on the reported measurements, the P-SAN makes a decision as to which of the A-SANs shall serve the terminal device when the link between the P-SAN and terminal device is lost.

Even when there is no data transmission from or to an A-SAN, the A-SAN should track the terminal device by periodically transmitting known pilot signals on certain test beams, as directed by the P-SAN, in some scheduled radio resources, so that the A-SAN can be readily aware of which beam to use to transmit to or receive from the terminal device when needed.

Although the concept of terminal device-specific SvC is theoretically feasible to be used for avoiding sudden service interruption in high-frequency wireless communication systems as explained above, it is not robust enough to work well in real systems.

Figure 1:
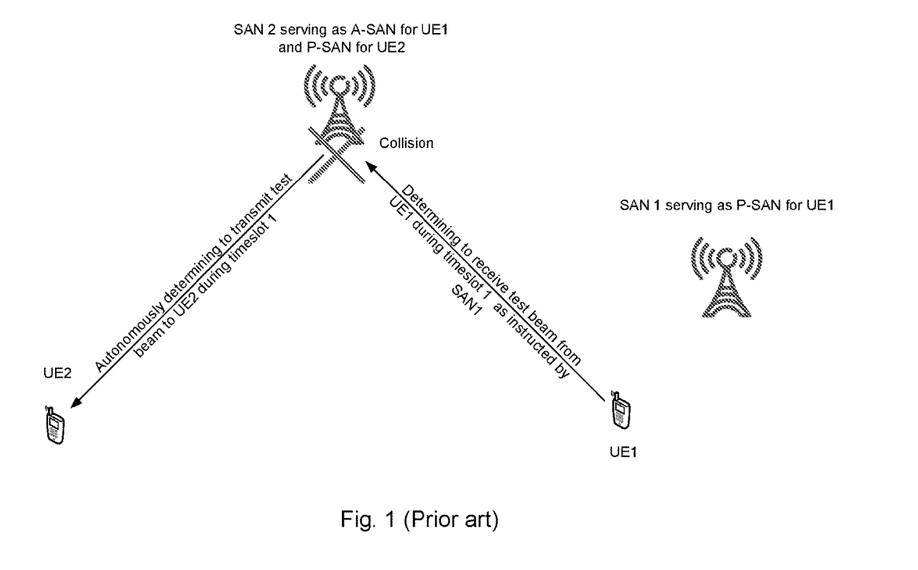
FIG. 1 is a diagram illustrating a scenario where SAN2 is faced with a conflict between test beam transmission directions determined by itself and indicated by SAN1 as well as a conflict between terminal devices to be tracked determined by itself and indicated by SAN1.

To be specific, as illustrated in FIG. 1, SAN1 may serve as a P-SAN for UE1, and SAN2 may serve as an A-SAN for UE1 and meanwhile serve as a P-SAN for UE2. Serving as the P-SAN for UE2, SAN2 may autonomously determine to transmit a test beam to UE2 during timeslot 1. On the other hand, SAN1 that serves as the P-SAN for UE1 may instruct SAN2, which serves as the A-SAN for UE1, to receive a test beam from UE1 during the same timeslot. Thus, SAN2 is in a dilemma as to whether to transmit or receive a test beam during timeslot 1, because there is a conflict between the test beam transmission directions determined by SAN2 itself and indicated by SAN1. Also, SAN 2 is faced with a dilemma of whether to communicate a test beam with UE1 or UE2, because there is a conflict between the terminal devices to be tracked determined by SAN2 itself and indicated by SAN1.

SUMMARY

In view of the foregoing, an object of the present disclosure is to facilitate coordination among SANs in an SvC by eliminating at least one of the conflict between test beam transmission directions and the conflict between terminal devices to be tracked as described above.

According to a first aspect of the present disclosure, there is provided a method in an SAN for coordinating with a number of other SANs within a terminal device-specific serving cluster to which the SAN belongs. The method comprises determining an assignment of a communication direction to a timeslot. The assignment of the communication direction to the timeslot is common to all SANs in the serving cluster. The method further comprises transmitting or receiving at least one test beam in the communication direction during the timeslot.

Since the assignment of the communication direction to the timeslot is common to all SANs in the serving cluster, an A-SAN in the serving cluster can unambiguously determine its communication direction of the at least one test beam during the timeslot according to the common assignment, instead of autonomously determining the test beam transmission direction and meanwhile receiving from a P-SAN a test beam transmission direction determined by the P-SAN.

Accordingly, the conflict between test beam transmission directions determined by A-SAN and P-SAN is eliminated.

In an embodiment, when the SAN serves as an A-SAN, the method may further comprise: before transmitting or receiving at least one test beam in the communication direction during the timeslot, receiving, from at least one of said other SANs which serve as P-SANs within the serving cluster, at least one deadlines for performing beam tracking for respective terminal devices in the communication direction. Then, the SAN may determine, for the respective terminal devices, priorities for transmitting or receiving test beams thereto or therefrom, based on the received deadlines. A higher priority may be determined for a terminal device if the deadline for performing beam tracking for the terminal device in the communication direction is closer to the timeslot. Next, the SAN may transmit or receive at least one test beam in the communication direction during the timeslot to or from the terminal device with the highest priority.

By determining priorities for respective terminal devices based on deadlines for performing beam tracking for the respective terminal devices and transmitting or receiving at least one test beam to or from the terminal device with the highest priority, it is possible for the A-SAN to determine a unique terminal device to be tracked. Thus, the conflict between terminal devices to be tracked determined by A-SAN and P-SAN is eliminated.

According to a second aspect of the present disclosure, there is provided an SAN for coordinating with a number of other SANs within a terminal device-specific serving cluster to which the SAN belongs. The SAN comprises an assignment determining unit and a transceiver. The assignment determining unit is configured to determine an assignment of a communication direction to a timeslot. The assignment of the communication direction to the timeslot is common to all SANs in the serving cluster. The transceiver is configured to transmit or receive at least one test beam in the communication direction during the timeslot.

According to a third aspect of the present disclosure, there is provided an SAN for coordinating with a number of other SANs within a terminal device-specific serving cluster to which the SAN belongs. The SAN comprises a transceiver, a processor and a memory. The memory has machine-readable program code stored therein. When executed by the processor, the program code causes the wireless communication device to perform the method according to the first aspect of the present disclosure.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
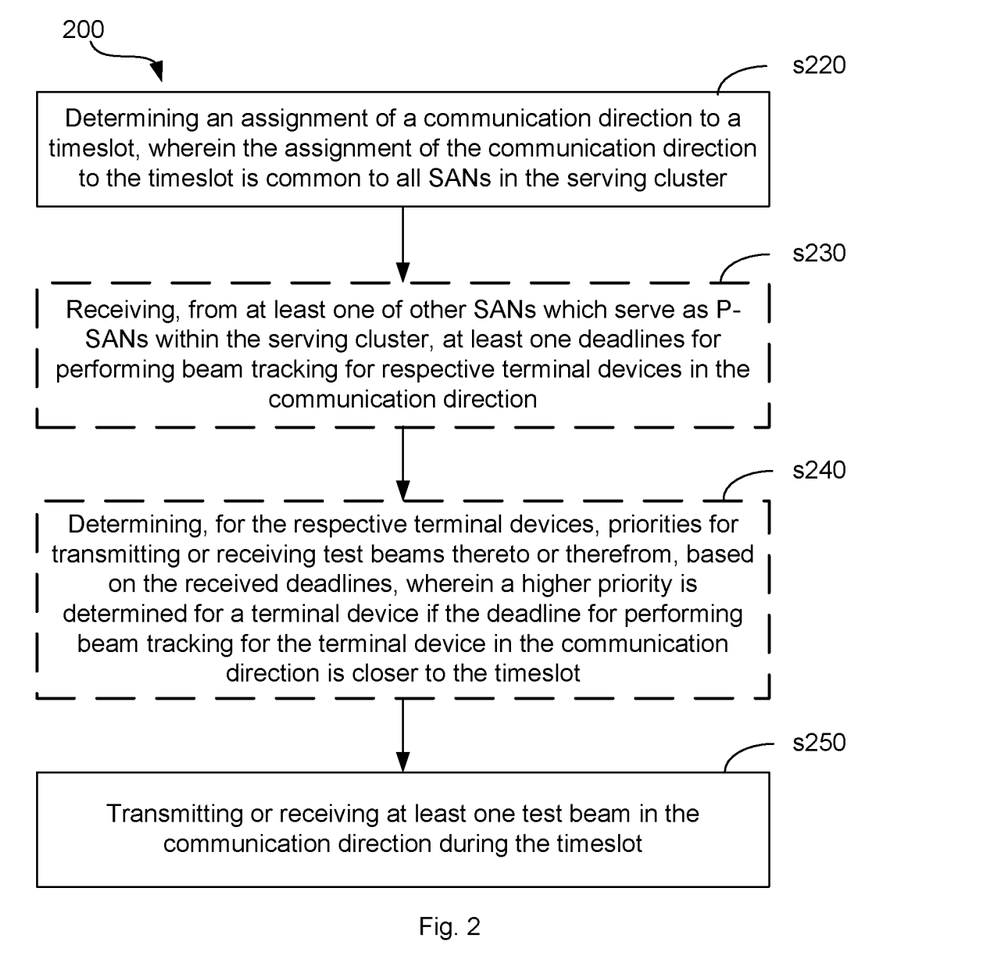
FIGS. 2-4 are flowcharts illustrating operations of a method in an SAN for coordinating with a number of other SANs within a terminal device-specific serving cluster to which the SAN belongs according to the present disclosure.

FIG. 2 schematically illustrates a method 200 in an SAN for coordinating with a number of other SANs within a terminal device-specific serving cluster to which the SAN belongs according to the present disclosure.

As illustrated, initially, an assignment of a communication direction to a timeslot is determined at block s220. The assignment of the communication direction to the timeslot is common to all SANs in the serving cluster.

Based on the assignment of the communication direction to the timeslot determined at block s220, at least one test beam is transmitted or received in the communication direction during the timeslot at block s250.

Specifically, if the assignment determined at block s220 indicates a downlink (DL) communication direction assigned to the timeslot, then the SAN transmits at least one test beam in the DL communication direction during the timeslot at block s250. Likewise, if the assignment determined at block s220 indicates a uplink (UL) communication direction assigned to the timeslot, then the SAN receives at least one test beam in the UL communication direction during the timeslot at block s250.

Since the assignment of the communication direction to the timeslot determined at block s220 is common to all SANs in the serving cluster, an A-SAN in the serving cluster can unambiguously determine its communication direction of the at least one test beam during the timeslot according to the common assignment, instead of autonomously determining the test beam transmission direction and meanwhile receiving from a P-SAN a test beam transmission direction determined by the P-SAN. Accordingly, the conflict between test beam transmission directions determined by A-SAN and P-SAN is eliminated.

Figure 3:
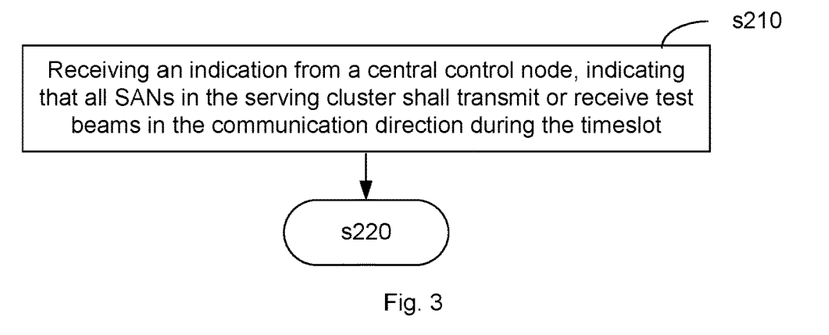

In order to for the SAN to determine the assignment of the communication direction to the timeslot at block s220, the method 200 may further comprise receiving an indication from a central control node indicating that the communication direction will be assigned to the timeslot, as illustrated in block s210 of FIG. 3. Then, at block s220, the assignment of the communication direction to the timeslot may be determined based on the indication received at block s210. As those skilled in the art will appreciate, the central control node may be one of the SANs in the serving cluster or a network element other than the SANs.

Instead of being determined by directly referring to the indication from the central control node, the assignment common to all SANs in the serving cluster may be determined through negotiation between the SANs. To this end, the method 200 may alternatively further comprise operations illustrated in blocks of FIG. 4.

Figure 4:
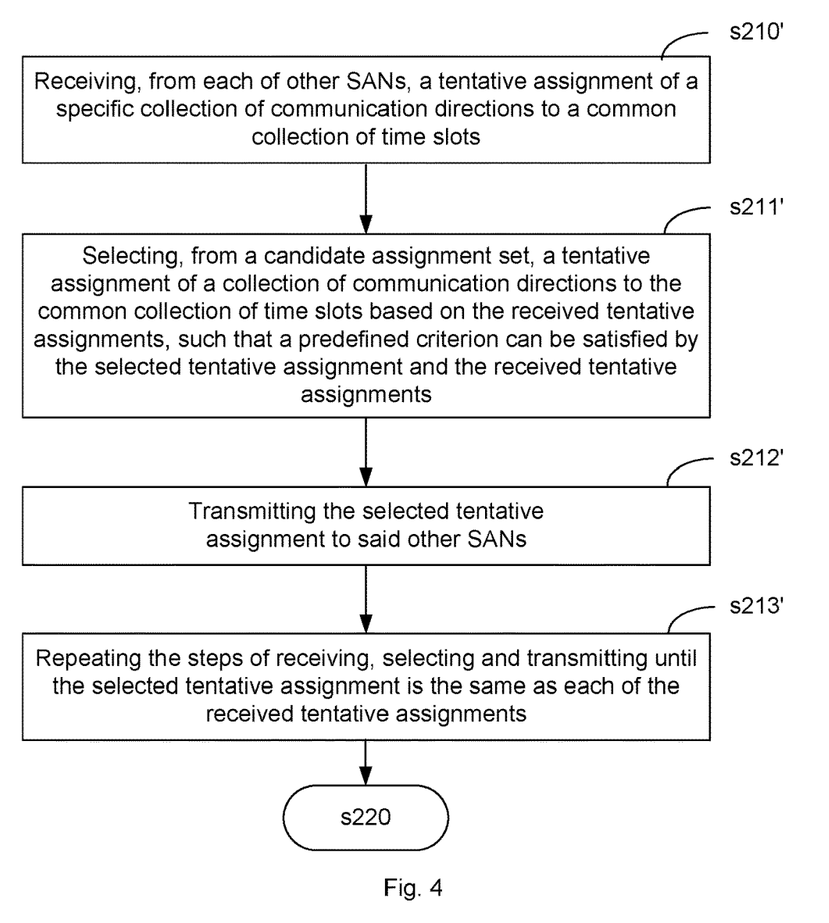

Specifically, at block s210', the SAN may receive, from each of other SANs in the serving cluster, a tentative assignment of a specific collection of communication directions to a common collection of timeslots. Then, at block s211', the SAN may select, from a candidate assignment set, a tentative assignment of a collection of communication directions to the common collection of timeslots based on the received tentative assignments, such that a predefined criterion can be satisfied by the selected tentative assignment and the received tentative assignments.

By way of illustration rather than limitation, the predefined criterion may be to maximize a sum of numbers of timeslots with agreed communication directions. Each of the numbers of timeslots with agreed communication directions may be determined based on the selected tentative assignment and a respective one of the received tentative assignments as a number of timeslots, for each of which the selected tentative assignment and the respective received tentative assignment agree with each other on communication direction.

Next, at block s212', the SAN may transmit the selected tentative assignment to other SANs in the serving cluster. Thereafter, at block s213', the SAN may repeat the operations of receiving, selecting and transmitting until the selected tentative assignment is the same as each of the received tentative assignments.

Subsequently, at block s220, the assignment of the communication direction to the timeslot may be determined based on the selected tentative assignment of the collection of communication directions to the common collection of timeslots that is the same as each of the received tentative assignments. For example, this may be done by choosing one of the common collection of timeslots and its corresponding communication direction as indicated by the selected tentative assignment of the collection of communication directions to the common collection of timeslots.

In the following, it will be illustrated, by referring to an exemplary scenario where the serving cluster includes only three SANs denoted as SAN1, SAN2 and SAN3, how the SAN may determine the assignment of the communication direction to the timeslot by performing the above-described operations.

To facilitate illustration, it is supposed that the common collection of timeslots includes only four timeslots. Then, an assignment of a collection of communication directions to the common collection of timeslots may be mathematically denoted as a vector consisting of four elements, each of which may take a value from {U, D, N}. When an element takes its value as U/D, it indicates that an uplink/downlink direction is assigned to the timeslot corresponding to the element. When an element takes its value as N, it indicates that the timeslot corresponding to the element is unused.

Without loss of generality, it is further supposed that, at a certain point of time, SAN1, SAN2 and SAN3 have selected their respective tentative assignments of respective collections of communication directions to the common collection of timeslots as [UUUU], [UUDD] and [NNNN].

From the perspective of SAN1, it receives the respective tentative assignments from SAN2 and SAN3 as [UUDD] and [NNNN] at block s210'.

Then, at block s211', SAN1 selects its tentative assignment based on the received tentative assignments [UUDD] and [NNNN] in accordance with a predefined criterion. In case the above-described predefined criterion to maximize the sum of numbers of timeslots with agreed communication directions is used, a tentative assignment [UUDD] would be selected, since the selected tentative assignment [UUDD] and one of the received tentative assignments [UUDD] agree with each other on communication direction at 4 timeslots, the selected tentative assignment [UUDD] and the other of the received tentative assignments [NNNN] agree with each other on communication direction at 0 timeslot and the sum of numbers of timeslots with agreed communication directions (i.e., 4+0=4) is larger than that achievable when any other candidate assignment (e.g., [DDDD]) is selected.

Then, at block s212', SAN1 transmits the selected tentative assignment to SAN2 and SAN3. Because its selected tentative assignment [UUDD] is not the same as each of the received tentative assignments [UUDD] and [NNNN], SAN 1 waits for new tentative assignments from SAN2 and SAN3 so as to select and transmit its new tentative assignment to SAN2 and SAN3 at block s213'.

From the perspective of SAN2, it thus receives from SAN1 and SAN3 respective tentative assignments as [UUDD] and [NNNN]. Likewise, SAN2 selects its tentative assignment as [UUDD] based on the received tentative assignments [UUDD] and [NNNN] in accordance with the above described predefined criterion and transmits the selected tentative assignment [UUDD] to SAN1 and SAN3.

Consequently, SAN3 receives from SAN1 and SAN2 respective tentative assignments as [UUDD] and [UUDD], selects its tentative assignment as [UUDD] based on the received tentative assignments [UUDD] and [UUDD], and transmits the selected tentative assignment [UUDD] to SAN1 and SAN2.

Accordingly, from the perspective of SAN1, it receives from SAN2 and SAN3 respective tentative assignments as [UUDD] and [UUDD], selects its new tentative assignment as [UUDD] and transmits the same to SAN2 and SAN3 at block s213'. Because the selected tentative assignment is the same as each of the received tentative assignments, SAN1 determines the assignment of the communication direction to the timeslot based on the selected tentative assignment of the collection of communication directions to a common collection of timeslots at block s220, instead of repeating the operations of receiving, selecting and transmitting at block s213'. For example, SAN1 may choose the second one of the common collection of timeslots and its corresponding communication direction 'U' as indicated by the selected tentative assignment [UUDD].

As those skilled in the art will appreciate, the predefined criterion described above is illustrative rather than limiting. For example, instead of maximizing the sum of numbers of timeslots with agreed communication directions, the predefined criterion may be to maximize a sum of arithmetically processed (for example, $n^{th}$ powers or roots of) numbers of timeslots with agreed communication directions.

Referring back to FIG. 2, when the SAN serves as an A-SAN, the method 200 may further comprise operations illustrated in blocks s230 and s240 of FIG. 2. Specifically, at block s230, the SAN may receive, from at least one of other SANs which serve as P-SANs within the serving cluster, at least one deadlines for performing beam tracking for respective terminal devices in the communication direction. At block s240, the SAN may determine, for the respective terminal devices, priorities for transmitting or receiving test beams thereto or therefrom, based on the received deadlines, wherein a higher priority is determined for a terminal device if the deadline for performing beam tracking for the terminal device in the communication direction is closer to the timeslot. Then, at block s250, the SAN may transmit or receive at least one test beam in the communication direction during the timeslot to or from the terminal device with the highest priority.

Correspondingly, when the SAN serves as a P-SAN, the SAN may transmit, to other SANs in the serving cluster, a deadline for performing beam tracking for a terminal device.

Continuing with the above example where the serving cluster includes only three SANs denoted as SAN1, SAN2 and SAN3, it is supposed that SAN2 receives from SAN1, which serves as a P-SAN for UE1, a deadline for performing beam tracking for UE1, and receives from SAN3, which serves as a P-SAN for UE3, a deadline for performing beam tracking for UE3. Further, it is supposed that the deadline for performing beam tracking for UE1 is closer to the second one of the common collection of timeslots chosen at block s220 in the above example, as compared with the deadline for performing beam tracking for UE3. Then, SAN2 would determine a higher priority for UE1 than for UE3 and accordingly receive at least one test beam from UE1 during the second timeslot.

By determining priorities for respective terminal devices based on deadlines for performing beam tracking for the respective terminal devices and transmitting or receiving at least one test beam to or from the terminal device with the highest priority, it is possible for the A-SAN to determine a unique terminal device to be tracked. Thus, the conflict between terminal devices to be tracked determined by A-SAN and P-SAN is eliminated.

Figure 5:
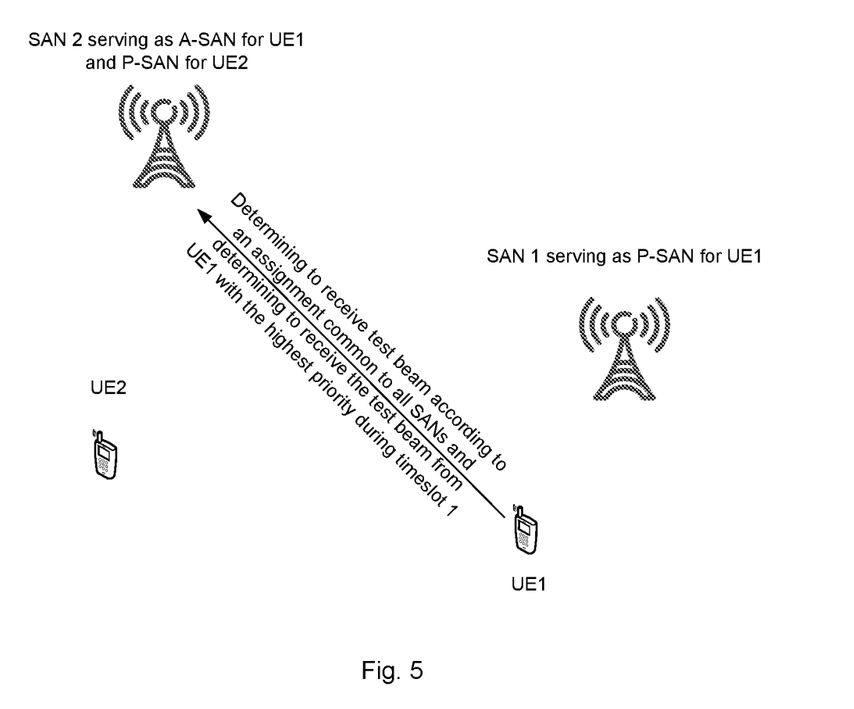
FIG. 5 is a diagram illustrating a scenario where the conflict between test beam transmission directions determined by A-SAN and P-SAN and the conflict between terminal devices to be tracked determined by P-SAN and A-SAN are eliminated by applying the proposed method as illustrated in FIG. 2.

FIG. 5 illustrates a scenario where the conflict between test beam transmission directions determined by A-SAN and P-SAN and the conflict between terminal devices to be tracked determined by P-SAN and A-SAN are eliminated by applying the proposed method as illustrated in FIG. 2. As described above, through negotiation with SAN1 and SAN3 (not shown), SAN2 determines that an UL communication direction is assigned to the second one of the common collection of timeslots. In addition, SAN2 determines that it shall receive at least one test beam from UE1 during the second one of the common collection of timeslots as an A-SAN. In case there is no need to assist in tracking UEs served by other SANs, SAN2 may serve as a P-SAN for UE2 at the second timeslot.

In the following, a structure of an SAN 600 according to the present disclosure will be described with reference to FIG. 6.

Figure 6:
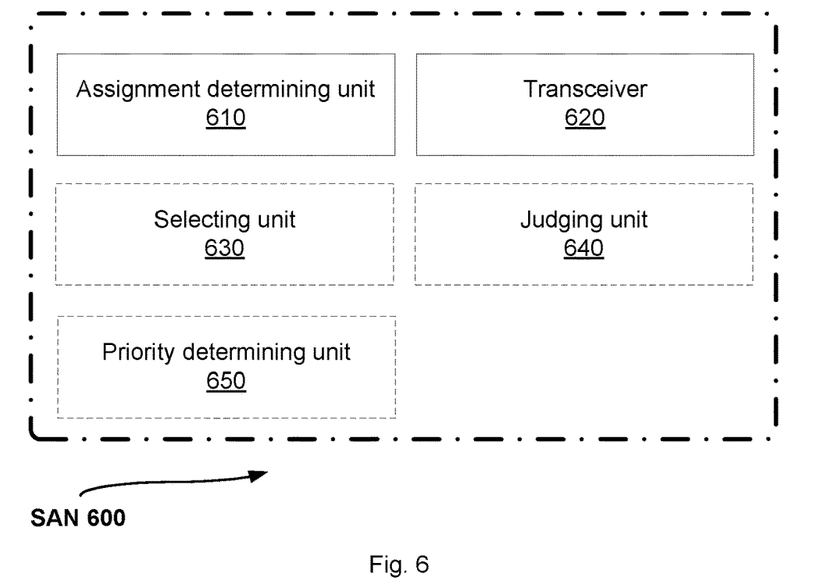
FIG. 6 is a block diagram illustrating a structure of an SAN according to the present disclosure.

As shown in FIG. 6, the SAN comprises an assignment determining unit 610 and a transceiver 620 coupled to the assignment determining unit 610. The assignment determining unit 610 is configured to determine an assignment of a communication direction to a timeslot. The assignment of the communication direction to the timeslot is common to all SANs in the serving cluster. The transceiver 620 is configured to transmit or receive at least one test beam in the communication direction during the timeslot.

In an embodiment, the transceiver 620 may be further configured to receive an indication from a central control node, indicating that the communication direction will be assigned to the timeslot. The assignment determining unit 610 may determine the assignment of the communication direction to the timeslot based on the indication.

In an embodiment, the transceiver 620 may be further configured to receive, from each of said other SANs, a tentative assignment of a specific collection of communication directions to a common collection of timeslots. The SAN 600 may further comprise a selecting unit 630 configured to select, from a candidate assignment set, a tentative assignment of a collection of communication directions to the common collection of timeslots based on the received tentative assignments, such that a predefined criterion can be satisfied by the selected tentative assignment and the received tentative assignments. The transceiver 620 may be further configured to transmit the selected tentative assignment to said other SANs. The SAN 600 may further comprise a judging unit 640 configured to judge whether the selected tentative assignment is the same as each of the received tentative assignments, and then inform the transceiver 620 and the selecting unit 630 when the selected tentative assignment is not the same as any of the received tentative assignments. The assignment determining unit 610 may be configured to determine the assignment of the communication direction to the timeslot based on the selected tentative assignment, when the judging unit 640 judges that the selected tentative assignment is the same as each of the received tentative assignments.

In an embodiment, the assignment determining unit 610 may be configured to determine the assignment of the communication direction to the timeslot by choosing one of the common collection of timeslots and its corresponding communication direction as indicated by the selected tentative assignment of the collection of communication directions to the common collection of timeslots.

In an embodiment, the predefined criterion may be to maximize a sum of numbers of timeslots with agreed communication directions, each of the numbers of timeslot with agreed communication directions being determined based on the selected tentative assignment and a respective one of the received tentative assignments as a number of timeslots, for each of which the selected tentative assignment and the respective received tentative assignment agree with each other on communication direction.

In an embodiment, when the SAN serves as a P-SAN, the transceiver 620 may be further configured to transmit, to said other SANs, a deadline for performing beam tracking for a terminal device.

In an embodiment, when the SAN serves as a A-SAN, the transceiver 620 may be further configured to receive, from at least one of said other SANs which serve as P-SANs within the serving cluster, at least one deadlines for performing beam tracking for respective terminal devices in the communication direction, before transmitting or receiving at least one test beam in the communication direction during the timeslot. The SAN may further comprise a priority determining unit 650 configured to determine, for the respective terminal devices, priorities for transmitting or receiving test beams thereto or therefrom, based on the received deadlines, wherein a higher priority is determined for a terminal device if the deadline for performing beam tracking for the terminal device in the communication direction is closer to the timeslot. The transceiver 620 may transmit or receive at least one test beam in the communication direction during the timeslot to or from the terminal device with the highest priority.

As those skilled in the art will appreciate, the above-described units (including the assignment determining unit 610, transceiver 620, selecting unit 630, judging unit 640, and priority determining unit) may be interconnected with each other through one or more interconnect buses. These units may be implemented separately as suitable dedicated circuits including processors and respective non-transitory computer-readable storage medium. Nevertheless, these units can also be implemented using any number of dedicated circuits through functional combination or separation. In some embodiments, these units may be even combined in a single application specific integrated circuit (ASIC).

Figure 7:
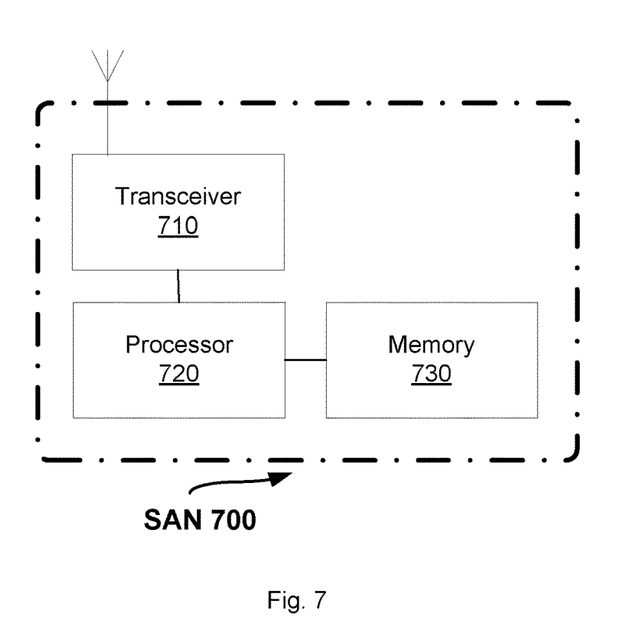
FIG. 7 is a block diagram illustrating an exemplary hardware implementation of an SAN according to the present disclosure.

As an alternative software-based implementation, there may be provided an SAN 700 comprising a transceiver 710, a processor 720 (including but not limited to a microprocessor, a microcontroller or a Digital Signal Processor (DSP), etc.) coupled to the transceiver 710, and a memory 730 coupled to the processor 720, as illustrated in FIG. 7. The memory 730 stores machine-readable program code executable by the processor 720. The processor 720, when executing the machine-readable program code, serves as the above-described assignment determining unit 610 and possibly the selecting unit 630, judging unit 640 and/or priority determining unit 650 and controls the transceiver 620 to perform transmission or reception.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method in a Serving Access Node (SAN) for coordinating with a number of other SANs within a terminal device-specific serving cluster to which the SAN belongs, the method comprising:
    determining an assignment of a communication direction to a timeslot, wherein the assignment of the communication direction to the timeslot is common to all SANs in the serving cluster; and
    transmitting or receiving at least one test beam in the communication direction during the timeslot.

2. The method of claim 1, further comprising:
    receiving an indication from a central control node, indicating that the communication direction will be assigned to the timeslot, and wherein
    the determining the assignment of the communication direction to the timeslot is based on the indication.

3. The method of claim 1, further comprising:
    receiving, from each of said other SANs, a tentative assignment of a specific collection of communication directions to a common collection of timeslots;
    selecting, from a candidate assignment set, a tentative assignment of a collection of communication directions to the common collection of timeslots based on the received tentative assignments, such that a predefined criterion is satisfied by the selected tentative assignment and the received tentative assignments;
    transmitting the selected tentative assignment to said other SANs;
    repeating the receiving, selecting and transmitting until the selected tentative assignment is the same as each of the received tentative assignments, and wherein
    the determining the assignment of the communication direction to the timeslot is based on the selected tentative assignment of the collection of communication directions to the common collection of timeslots that is the same as each of the received tentative assignments.

4. The method of claim 3, wherein the assignment of the communication direction to the timeslot is determined by choosing one of the common collection of timeslots and its corresponding communication direction as indicated by the selected tentative assignment of the collection of communication directions to the common collection of timeslots.

5. The method of claim 4, wherein the predefined criterion is to maximize a sum of numbers of timeslots with agreed communication directions, each of the numbers of timeslots with agreed communication directions being determined based on the selected tentative assignment and a respective one of the received tentative assignments as a number of timeslots, for each of which the selected tentative assignment and the respective received tentative assignment agree with each other on communication direction.

6. The method of claim 3, wherein the predefined criterion is to maximize a sum of numbers of timeslots with agreed communication directions, each of the numbers of timeslots with agreed communication directions being determined based on the selected tentative assignment and a respective one of the received tentative assignments as a number of timeslots, for each of which the selected tentative assignment and the respective received tentative assignment agree with each other on communication direction.

7. The method of claim 1, wherein when the SAN serves as a Principal-SAN (P-SAN) the method further comprises:
    transmitting, to said other SANs, a deadline for performing beam tracking for a terminal device.

8. The method of claim 1, wherein when the SAN serves as an Assistant-SAN (A-SAN) the method further comprises:
    before transmitting or receiving at least one test beam in the communication direction during the timeslot,
    receiving, from at least one of said other SANs which serve as P-SANs within the serving cluster, at least one deadlines for performing beam tracking for respective terminal devices in the communication direction; and determining, for the respective terminal devices, priorities for transmitting or receiving test beams thereto or therefrom, based on the received deadlines, wherein a higher priority is determined for a terminal device if the deadline for performing beam tracking for the terminal device in the communication direction is closer to the timeslot, and wherein the transmitting or receiving at least one test beam in the communication direction during the timeslot is to or from the terminal device with the highest priority.

9. A Serving Access Node, SAN, for coordinating with a number of other SANs within a terminal device-specific serving cluster to which the SAN belongs, the SAN comprising:

a transceiver;

a processor; and a memory for storing machine-readable program code, which when executed by the processor causes the SAN to perform operations to:

determine an assignment of a communication direction to a timeslot, wherein the assignment of the communication direction to the timeslot is common to all SANs in the serving cluster; and transmit or receive at least one test beam in the communication direction during the timeslot.

10. The SAN of claim 9, wherein the program code, which when executed by the processor causes the SAN to further perform operations to:

receive an indication from a central control node, indicating that the communication direction will be assigned to the timeslot, and wherein the assignment of the communication direction to the timeslot is based on the indication.

11. The SAN of claim 9, wherein the program code, which when executed by the processor causes the SAN to further perform operations to:

receive from each of said other SANs, a tentative assignment of a specific collection of communication directions to a common collection of timeslots;

select from a candidate assignment set, a tentative assignment of a collection of communication directions to the common collection of timeslots based on the received tentative assignments, such that a predefined criterion is satisfied by the selected tentative assignment and the received tentative assignments;

transmit the selected tentative assignment to said other SANs; and repeat the operations of receive, select and transmit until the selected tentative assignment is the same as each of the received tentative assignments, and wherein the assignment of the communication direction to the timeslot is based on the selected tentative assignment of the collection of communication directions to the common collection of timeslots that is the same as each of the received tentative assignments.

12. The SAN of claim 11, wherein the assignment of the communication direction to the timeslot is determined by choosing one of the common collection of timeslots and its corresponding communication direction as indicated by the selected tentative assignment of the collection of communication directions to the common collection of timeslots.

13. The SAN of claim 12, wherein the predefined criterion is to maximize a sum of numbers of timeslots with agreed communication directions, each of the numbers of timeslots with agreed communication directions being determined based on the selected tentative assignment and a respective one of the received tentative assignments as a number of timeslots, for each of which the selected tentative assignment and the respective received tentative assignment agree with each other on communication direction.

14. The SAN of claim 11, wherein the predefined criterion is to maximize a sum of numbers of timeslots with agreed communication directions, each of the numbers of timeslots with agreed communication directions being determined based on the selected tentative assignment and a respective one of the received tentative assignments as a number of timeslots, for each of which the selected tentative assignment and the respective received tentative assignment agree with each other on communication direction.

15. The SAN of claim 9, wherein when the SAN serves as a Principal-SAN (P-SAN), the program code, which when executed by the processor causes the SAN to further perform operations to:

transmit to said other SANs, a deadline for performing beam tracking for a terminal device.

16. The SAN of claim 9, wherein when the SAN serves as an Assistant-SAN (A-SAN), the program code, which when executed by the processor causes the SAN to further perform operations to:

before transmitting or receiving at least one test beam in the communication direction during the timeslot, receive from at least one of said other SANs which serve as P-SANs within the serving cluster, at least one deadlines for performing beam tracking for respective terminal devices in the communication direction; and determine for the respective terminal devices, priorities for transmitting or receiving test beams thereto or therefrom, based on the received deadlines, wherein a higher priority is determined for a terminal device if the deadline for performing beam tracking for the terminal device in the communication direction is closer to the timeslot, and wherein the operations of transmit or receive at least one test beam in the communication direction during the timeslot is performed to or from the terminal device with the highest priority.

* * * * *